Patented June 13, 1944

2,351,496

UNITED STATES PATENT OFFICE 2,351,496

THIAZYL SULPHENAMIDE DERIVATIVES

William H. Ebelke, Naugatuck, Conn., assignor to United States Rubber Company, New York, N. Y., a corporation of New Jersey No Drawing. Original application November 23, 1940, Serial No. 366,885. Divided and this application November 27, 1941, Serial No. 420,678

5 Claims. (Cl. 260—787)

This application is a division of my co-pending application Serial No. 366,885, filed November 23, 1940, now Patent No. 2,343,538, dated March 7, 1944.

This invention relates to a new class of compounds, particularly useful as vulcanization accelerators, and generally described as N-carbamyl or N-thiocarbamyl derivatives of thiazyl sulphenamides in which the carbamyl amino group may be substituted or unsubstituted. They are prepared by the reaction of a thiazyl sulphur halide with ureas of the general formula

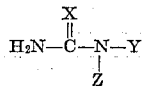

where X is sulphur or oxygen; Y and Z are hydrogen, alkyl, alkenyl, aryl, aralkyl, or alkylene radicals of a heterocylic group with the N. The aryl, and aralkyl may also contain substituents such as halogen, alkyl, hydroxy, nitro, etc.

The thiazyl sulphur halide may be prepared in solution by passing a halogen, e. g. dry chlorine, into a suspension or slurry of the 1,1'-dithio bis thiazole (illustrated by 1,1'-dithio bis benzothiazole) in an organic solvent such as benzene, tetrachloro ethylene, carbon tetrachloride, etc., which is unreactive with the halogen, until substantially complete solution ensues. After heating to remove excess halogen, the hot solution is freed of insoluble matter and cooled. The thiazyl sulphur halide has the general formula

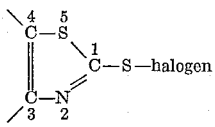

The reaction is carried out by heating a solution of the thiazyl sulphur halide in an inert solvent with a suspension of the urea. Apparently one molecule of hydrogen halide splits off by junction of the halogen of the thiazyl sulphur halide with an amino hydrogen of the urea. At present the exact identity of the resulting product is not clear, but it is believed to have the probable general formula

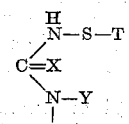

X, Y, Z being as above stated; and T representing a 1-thiazyl radical, preferably a 1-arylene thiazyl radical. The thiazyl radical may contain various substituents such as hydrogen, halogen, alkyl, aralkyl, aryl, alicyclic, alkoxy, or aryloxy radicals.

The following are given as representative examples:

N-(carbamyl) benzothiazyl sulphenamide
N-(thio carbamyl) benzothiazyl sulphenamide
N-(phenyl carbamyl) benzothiazyl sulphenamide
N-(phenyl thiocarbamyl) benzothiazyl sulphenamide
N-(methyl carbamyl) benzothiazyl sulphenamide
N-(methyl thiocarbamyl) benzothiazyl sulphenamide
N-(tolyl carbamyl) benzothiazyl sulphenamide
N-(tolyl thiocarbamyl) benzothiazyl sulphenamide
N-(diphenyl carbamyl) benzothiazyl sulphenamide
N-(diphenyl thiocarbamyl) benzothiazyl sulphenamide
N-(nitrophenyl carbamyl) benzothiazyl sulphenamide
N-(nitrophenyl thiocarbamyl) benzothiazyl sulphenamide
N-(carbamyl) thiazyl sulphenamide
N-(phenyl carbamyl) thiazyl sulphenamide
N-(thiocarbamyl) thiazyl sulphenamide
N-(phenyl thiocarbamyl) thiazyl sulphenamide
N-(carbamyl) methyl thiazyl sulphenamide
N-(thiocarbamyl) methyl thiazyl sulphenamide
N-(phenylcarbamyl) methyl thiazyl sulphenamide
N-(carbamyl) dihydrothiazyl sulphenamide
N-(thiocarbamyl) dihydrothiazyl sulphenamide
N-(phenyl carbamyl) dihydrothiazyl sulphenamide
N-(phenyl thiocarbamyl) dihydrothiazyl sulphenamide
N-(piperidyl carbonyl) benzothiazyl sulphenamide
N-(piperidyl carbonyl) methyl thiazyl sulphenamide
N-(piperidyl carbonyl) dihydrothiazyl sulphenamide
N-(morpholyl carbonyl) benzothiazyl sulphenamide
N-(morpholyl carbonyl) thiazyl sulphenamide
N-(morpholyl carbonyl) methyl thiazyl sulphenamide
N-(morpholyl thiocarbonyl) methyl thiazyl sulphenamide Illustrative of their preparation and use in rubber as vulcanizing accelerators are the following examples, the parts being by weight:

EXAMPLE 1

*Preparation of N-(carbamyl) benzothiazyl sulphenamide*

A carbon tetrachloride solution containing 24 parts of benzothiazyl sulphur chloride was heated to boiling. 25 parts of urea were then added and the resultant slurry refluxed for 30 minutes. After cooling the product was filtered off, washed and dried. On digestion with hot water, 22 parts of an almost white crystalline powder, M. R. 182–186° C. with decomposition, were obtained. This, without purification, gave the following analysis:

|  | Percent |
|---|---|
| Nitrogen found | 17.0 |
| Nitrogen theory | 18.6 |
| Sulphur found | 28.4 |
| Sulphur theory | 26.8 |

On purification, a snow white powder was obtained, M. R. 195–196° C. with decomposition.

|  | Percent |
|---|---|
| Nitrogen found | 17.9 |
| Nitrogen theory | 18.6 |
| Sulphur found | 28.5 |
| Sulphur theory | 28.6 |

The product (M. R. 182–186° C. with decomposition) was incorporated into the following rubber stock, vulcanized and tested.

Master batch

| | |
|---|---|
| Smoked sheet | 100 |
| Carbon black | 45 |
| Zinc oxide | 5 |
| Pine tar | 3.50 |
| Zinc soap of cocoanut oil acids | 3.50 |
| Acetone-diphenylamine condensate (antioxidant) | 1.00 |
| Sulphur | 3.00 |
| | 161.00 |

Recipes

| | A | B | C |
|---|---|---|---|
| Above master batch | 161 | 161 | 161 |
| Mercaptobenzothiazole | | 0.8 | 1.0 |
| N-(carbamyl) benzothiazyl sulphenamide | 1.0 | | |

Tensiles

UNAGED

| | B E | B E | B E |
|---|---|---|---|
| 45'/30# | 3,610—716 | 4,200—736 | 4,540—743 |
| 60'/30# | 4,560—723 | 4,580—710 | 4,620—680 |
| 75'/30# | 4,610—673 | 4,600—680 | 4,660—673 |
| 90'/30# | 4,620—633 | 4,580—643 | 4,620—650 |

AGED 96 HOURS IN OXYGEN

| | | | |
|---|---|---|---|
| 45'/30# | 2,330—646 | 2,630—666 | 2,930—660 |
| 60'/30# | 2,550—646 | 2,610—630 | 2,610—616 |
| 75'/30# | 2,410—576 | 2,410—586 | 2,430—570 |
| 90'/30# | 2,430—543 | 2,420—553 | 2,470—550 |

T-50 AT 350 PER CENT

| | | | |
|---|---|---|---|
| 45'/30# | +10.4 | +5.0 | +2.6 |
| 60'/30# | +2.3 | −0.3 | −2.7 |
| 75'/30# | −4.7 | −4.7 | −7.7 |
| 90'/30# | −10.1 | −9.9 | −12.0 |

B=Break.    E=Elongation.

It is apparent that this chemical closely resembles mercaptobenzothiazole in strength. It also shows a definite advantage over the latter in that it gives more delayed action and so is safer to use because it does not tend to pre-cure the rubber during processing of the same.

EXAMPLE 2

*Preparation of N-(phenyl carbamyl) benzothiazyl sulphenamide*

A suspension of 26 parts of phenylurea in 500 parts of carbon tetrachloride was agitated under gentle reflux while a solution of 30 parts of benzothiazyl sulphur chloride in 375 parts of carbon tetrachloride was slowly added. After refluxing for 30 minutes the product was filtered, washed and dried. Following digestion with hot water, 32.1 parts of a white crystalline material were obtained; M. R. 173–183° C. with decomposition. Digestion with alcohol gave a somewhat purer material, M. R. 182–188° C. with decomposition.

|  | Percent |
|---|---|
| Nitrogen found | 13.0 |
| Nitrogen theory | 13.9 |
| Sulphur found | 21.8 |
| Sulphur theory | 21.3 |

The following rubber stock was made up and tested:

Master batch

| | |
|---|---|
| Smoked sheet | 100 |
| Carbon black | 45 |
| Zinc oxide | 5 |
| Pine tar | 3.5 |
| Zinc soap of cocoanut oil acids | 3.5 |
| Sulphur | 3.0 |
| | 160.0 |

Recipes

| | A | B |
|---|---|---|
| Above master batch | 160 | 160 |
| Mercaptobenzothiazole | | 1.0 |
| N-(phenyl carbamyl) benzothiazyl sulphenamide | 1.0 | |

Tensiles

UNAGED

| | B E | B E |
|---|---|---|
| 45'/30# | 4,000—646 | 4,200—630 |
| 60'/30# | 4,260—596 | 4,200—583 |
| 75'/30# | 4,260—570 | 4,300—560 |
| 90'/30# | 4,220—543 | 4,180—530 |

T-50 AT 350 PER CENT

| | | |
|---|---|---|
| 45'/30# | +4.5 | −1.9 |
| 60'/30# | −3.8 | −7.6 |
| 75'/30# | −11.3 | −12.7 |
| 90'/30# | −16.5 | −16.5 |

SCORCH TEST

| | | |
|---|---|---|
| 60'/5# | 170—1,176 | 253—1,020 |
| 90'/5# | 180—1,136 | 750—843 |
| 105'/5# | 170—1,090 | 1,183—753 |
| 120'/5# | 163—1,023 | 1,537—667 |
| 135'/5# | 170—1,033 | 1,945—687 |
| 150'/5# | 200—1,035 | 2,513—696 |

Obviously N-(phenyl carbamyl) benzothiazyl sulphenamide is an excellent accelerator and is superior to mercaptobenzothiazole in safety from precure.

EXAMPLE 3

*Preparation of N-(thiocarbamyl) benzothiazyl sulphenamide*

This chemical is prepared by a procedure similar to that used in Example 1. The product is a light yellow powder, M. R. 136–141° C.

|  | Per cent |
|---|---|
| Sulphur found | 40.8 |
| Sulphur theory | 39.80 |

N-(thiocarbamyl) benzothiazyl sulphenamide was tested in rubber to give the following results:

*Master batch*

| | |
|---|---|
| Smoked sheet | 100 |
| Carbon black | 45 |
| Zinc oxide | 5 |
| Pine tar | 3.50 |
| Zinc soap of cocoanut oil acids | 3.50 |
| Sulphur | 3.00 |
| Acetone-diphenylamine condensate (antioxidant) | 1.00 |
| | 161.00 |

*Recipes*

| | A | B |
|---|---|---|
| Above master batch | 161 | 161 |
| Mercaptobenzothiazole | 1.0 |  |
| N-(thiocarbamyl) benzothiazyl sulphenamide |  | 1.0 |

*Tensiles*

UNAGED

| | B | E | B | E |
|---|---|---|---|---|
| 45'/30# | 3,760 | 636 | 3,600 | 666 |
| 60'/30# | 4,100 | 663 | 3,880 | 630 |
| 75'/30# | 4,000 | 630 | 3,980 | 630 |
| 90'/30# | 4,000 | 626 | 3,880 | 606 |

AGED 96 HOURS AT 212° F.

| | | | | |
|---|---|---|---|---|
| 45'/30# | 3,380 | 530 | 3,570 | 546 |
| 60'/30# | 3,000 | 496 | 3,370 | 506 |
| 75'/30# | 2,680 | 383 | 3,160 | 456 |
| 90'/30# | 3,130 | 430 | 3,070 | 440 |

B=Break.    E=Elongation.

T-50 AT 350 PER CENT

| | | |
|---|---|---|
| 45'/30# | +2.0 | +3.2 |
| 60'/30# | −3.1 | −1.8 |
| 75'/30# | −8.7 | −7.7 |
| 90'/30# | −12.2 | −11.3 |

The chemicals may be employed in the vulcanization of rubber generally. The rubber may be masticated with other compounding and vulcanizing ingredients, or be in the form of a vulcanizable latex composition (natural or artificially prepared), or in the form of a deposit from such latex compositions.

The chemicals may be used alone, in conjunction with other accelerators such as mercaptobenzothiazole, or in conjunction with activating more basic nitrogen compositions such as diphenylguanidine.

The present invention is not limited in its use to the specific examples above set forth wherein the preferred accelerators are employed. Other ratios of the compounding ingredient than those mentioned in the examples as well as other well known fillers, pigments, etc. may be employed in the production of various types of rubber compounds as will be apparent to those skilled in the art.

The chemicals may also find use as pharmaceuticals, or intermediates in chemical synthesis.

Having thus described my invention, what I claim and desire to protect by Letters Patent is:

1. A method which comprises vulcanizing rubber with N-(carbamyl) benzothiazyl sulphenamide.

2. A method which comprises vulcanizing rubber with N-(thiocarbamyl) benzothiazyl sulphenamide.

3. A method which comprises vulcanizing rubber with N-(phenyl carbamyl) benzothiazyl sulphenamide.

4. A method which comprises vulcanizing rubber with a benzothiazyl sulphenamide in which one of the amine hydrogen atoms is replaced by the group

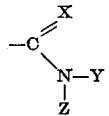

where X is a member selected from the group consisting of sulphur, and oxygen; Y and Z are radicals selected from the group consisting of hydrogen, alkyl, alkenyl, aralkyl, aryl, and alkylene radicals of a heterocyclic ring embodying the N.

5. A vulcanization product of rubber containing a compound having the formula

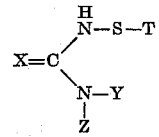

wherein X is a member selected from the group consisting of sulphur, and oxygen; T is a 1-thiazyl radical; Y and Z are radicals selected from the group consisting of hydrogen, alkyl, alkenyl, aralkyl, aryl, and alkylene radicals of a heterocyclic ring embodying the N.

WILLIAM H. EBELKE.